United States Patent
Itokazu et al.

(10) Patent No.: US 12,269,104 B2
(45) Date of Patent: Apr. 8, 2025

(54) MULTIWIRE ELECTRIC DISCHARGE MACHINE, MULTIWIRE ELECTRIC DISCHARGE MACHINING METHOD, AND SEMICONDUCTOR WAFER MANUFACTURING METHOD

(71) Applicant: Mitsubishi Electric Corporation, Tokyo (JP)

(72) Inventors: Atsushi Itokazu, Tokyo (JP); Yoichi Otomo, Tokyo (JP); Tsubasa Yagi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/710,263

(22) PCT Filed: Mar. 24, 2022

(86) PCT No.: PCT/JP2022/014162
§ 371 (c)(1),
(2) Date: May 15, 2024

(87) PCT Pub. No.: WO2023/181305
PCT Pub. Date: Sep. 28, 2023

(65) Prior Publication Data
US 2024/0326145 A1    Oct. 3, 2024

(51) Int. Cl.
B23H 7/10    (2006.01)
B23H 1/02    (2006.01)
B23H 7/06    (2006.01)

(52) U.S. Cl.
CPC ............. B23H 7/105 (2013.01); B23H 1/028 (2013.01); B23H 7/065 (2013.01)

(58) Field of Classification Search
CPC ......... B23H 1/028; B23H 7/065; B23H 7/105
See application file for complete search history.

(56) References Cited

U.S. PATENT DOCUMENTS

2013/0043217 A1    2/2013    Yuzawa et al.
2015/0027990 A1    1/2015    Yagashiro
(Continued)

FOREIGN PATENT DOCUMENTS

CN    104220201 A    12/2014
JP    H09-272122 A    10/1997
(Continued)

OTHER PUBLICATIONS

Machine Translation of Miyake et al (JP 2014097542), performed on Aug. 27, 2024 (Year: 2014).*
(Continued)

*Primary Examiner* — Brian W Jennison
(74) *Attorney, Agent, or Firm* — XSENSUS LLP

(57) ABSTRACT

A multiwire electric discharge machine includes: a plurality of guide rollers; a machining power supply that applies a voltage between each of a plurality of cutting wire sections and a workpiece; a dummy workpiece including a contact surface curved in such a way as to be capable of coming into contact with a curved surface of the workpiece except for an end point, the end point being to be reached by each of the plurality of cutting wire sections when machining of the workpiece is completed, the dummy workpiece supporting the workpiece from one side in a first direction, the first direction being a direction in which the workpiece moves; and a pressing mechanism including a pressing portion, the pressing mechanism pressing the workpiece against the dummy workpiece by bringing the pressing portion into contact with the workpiece from another side in the first direction.

13 Claims, 10 Drawing Sheets

(56) References Cited

U.S. PATENT DOCUMENTS

2015/0053650 A1  2/2015  Miyake et al.
2024/0207958 A1  6/2024  Miyake

FOREIGN PATENT DOCUMENTS

| JP | 2000-006138 A | | 1/2000 |
|---|---|---|---|
| JP | 2014097542 A | * | 5/2014 |
| JP | 2016-097497 A | | 5/2016 |
| JP | 5929957 B2 | | 6/2016 |
| JP | 5968200 B2 | | 8/2016 |
| JP | 6397738 B2 | | 9/2018 |
| JP | 6442282 B2 | | 12/2018 |
| JP | 6651064 B1 | | 2/2020 |
| JP | 6999865 B1 | | 1/2022 |
| WO | 2011/145390 A1 | | 11/2011 |

OTHER PUBLICATIONS

International Search Report and Written Opinion mailed on May 24, 2022, received for PCT Application No. PCT/JP2022/014162, filed on Mar. 24, 2022, 8 pages including English Translation.
Decision to Grant mailed on Oct. 18, 2022, received for JP Application 2022-544216, 5 pages including English Translation.
Office Action mailed Dec. 11, 2024 in corresponding Chinese patent application No. 202280086071.0 (10 pages; with English machine translation of summary).

* cited by examiner

MULTIWIRE ELECTRIC DISCHARGE MACHINE, MULTIWIRE ELECTRIC DISCHARGE MACHINING METHOD, AND SEMICONDUCTOR WAFER MANUFACTURING METHOD

CROSS-REFERENCE TO RELATED APPLICATION

This application is a national stage application, pursuant to 35 U.S.C. § 371, of International Patent Application No. PCT/JP2022/014162, filed Mar. 24, 2022, the entire contents of which are incorporated herein by reference.

FIELD

The present disclosure relates to a multiwire electric discharge machine, a multiwire electric discharge machining method, a thin plate manufacturing method, and a semiconductor wafer manufacturing method for simultaneously performing electric discharge machining at a plurality of positions on a workpiece.

BACKGROUND

In a multiwire electric discharge machine, a single wire electrode is wound multiple times to form a plurality of cutting wire sections parallel to each other, and electric discharge machining is simultaneously performed at each cutting wire section. Thus, a plurality of thin plates is cut from a workpiece at a time. Multiwire electric discharge machines are required to cut a plurality of thin plates from a workpiece without damaging the workpiece.

With regard to multiwire electric discharge machining of cutting semiconductor wafers from a cylindrical semiconductor ingot, Patent Literature 1 discloses a method for performing electric discharge machining of a semiconductor ingot by fixing a side surface of the semiconductor ingot to a base portion of a support mechanism that supports the semiconductor ingot and moving the support mechanism with respect to a wire. The side surface of the semiconductor ingot is fixed to a front surface of the base portion by use of an adhesive. The base portion is a rectangular parallelepiped, and the front surface of the base portion faces the semiconductor ingot.

CITATION LIST

Patent Literature

Patent Literature 1: Japanese Patent No. 6397738

SUMMARY OF INVENTION

Problem to be Solved by the Invention

In a multiwire electric discharge machine, machining fluid is sprayed from a nozzle onto a side surface of a workpiece so as to remove machining swarf from the inside of a groove formed in the workpiece by electric discharge machining. When thin plates are cut from a cylindrical workpiece, the interval between an injection port of the nozzle and the workpiece changes as machining proceeds. Depending on the distance between the injection port and the workpiece or the amount of sprayed machining fluid, a wire may be broken due to an unstable machining process. Therefore, in actual machining, a large amount of machining fluid is sprayed, and the speed of the workpiece relative to the wire is sequentially controlled according to the state of electric discharge between the workpiece and the wire. Thus, the machining process is prevented from becoming unstable. When the machining fluid is sprayed onto the workpiece in this manner, an external force is applied to the workpiece by the machining fluid.

Immediately before the cutting of the cylindrical workpiece is completed, the cross-sectional area of a connection portion at which the workpiece is to be cut into separate portions, that is, a portion that has not been cut, gradually decreases. The cross-sectional area refers to an area of a cross section perpendicular to a center line of a cylinder that is the workpiece. In the case of using the method of Patent Literature 1 above, the cross-sectional area of a portion that has not been cut decreases and in addition, a workpiece receives an external force. As a result, the workpiece is likely to be cracked as the cutting of the workpiece is coming to an end.

Furthermore, in the case of using the method of Patent Literature 1 above, while the cross-sectional area of the portion that has not been cut gradually decreases immediately before the cutting of the cylindrical workpiece is completed, the machining of the base portion is started when cutting wire sections reach the front surface of the base portion. That is, the amount of machining of the base portion rapidly increases from zero. As a result, a rapid increase in the amount of machining of the base portion, the speed of the workpiece relative to the cutting wire sections rapidly decreases. Thus, the amount of machining of the workpiece locally increases. As the amount of machining of the workpiece locally increases, the workpiece is likely to be cracked. Thus, the technique of Patent Literature 1 above has a problem in that it is difficult to reduce cracks in a workpiece.

The present disclosure has been made in view of the above, and an object of the present disclosure is to provide a multiwire electric discharge machine capable of reducing cracks in a workpiece.

Means to Solve the Problem

In order to solve the above-described problems and achieve the object, a multiwire electric discharge machine according to the present disclosure includes: a plurality of guide rollers to guide traveling of a wire electrode, the wire electrode being wound around the plurality of guide rollers multiple times at intervals; a machining power supply to apply a voltage between each of a plurality of cutting wire sections and a workpiece, the plurality of cutting wire sections being parallel sections of the wire electrode between a first guide roller and a second guide roller, the first guide roller and the second guide roller being included in the plurality of guide rollers; a dummy workpiece including a contact surface, the contact surface being curved in such a way as to be capable of coming into contact with a curved surface of the workpiece except for an end point, the workpiece having the curved surface, the end point being to be reached by each of the plurality of cutting wire sections when machining of the workpiece is completed, the dummy workpiece supporting the workpiece from one side in a first direction, the first direction being a direction in which the workpiece moves with respect to the plurality of cutting wire sections; and a pressing mechanism including a pressing portion capable of coming into contact with the curved surface of the workpiece, the pressing mechanism pressing the workpiece against the dummy workpiece by bringing the pressing portion into contact with the workpiece from another side in the first direction.

Effects of the Invention

The multiwire electric discharge machine according to the present disclosure has an effect of enabling cracks in a workpiece to be reduced.

DESCRIPTION OF EMBODIMENTS

Hereinafter, a multiwire electric discharge machine, a multiwire electric discharge machining method, a thin plate manufacturing method, and a semiconductor wafer manufacturing method according to an embodiment will be described in detail with reference to the drawings.

First Embodiment

Figure 1:
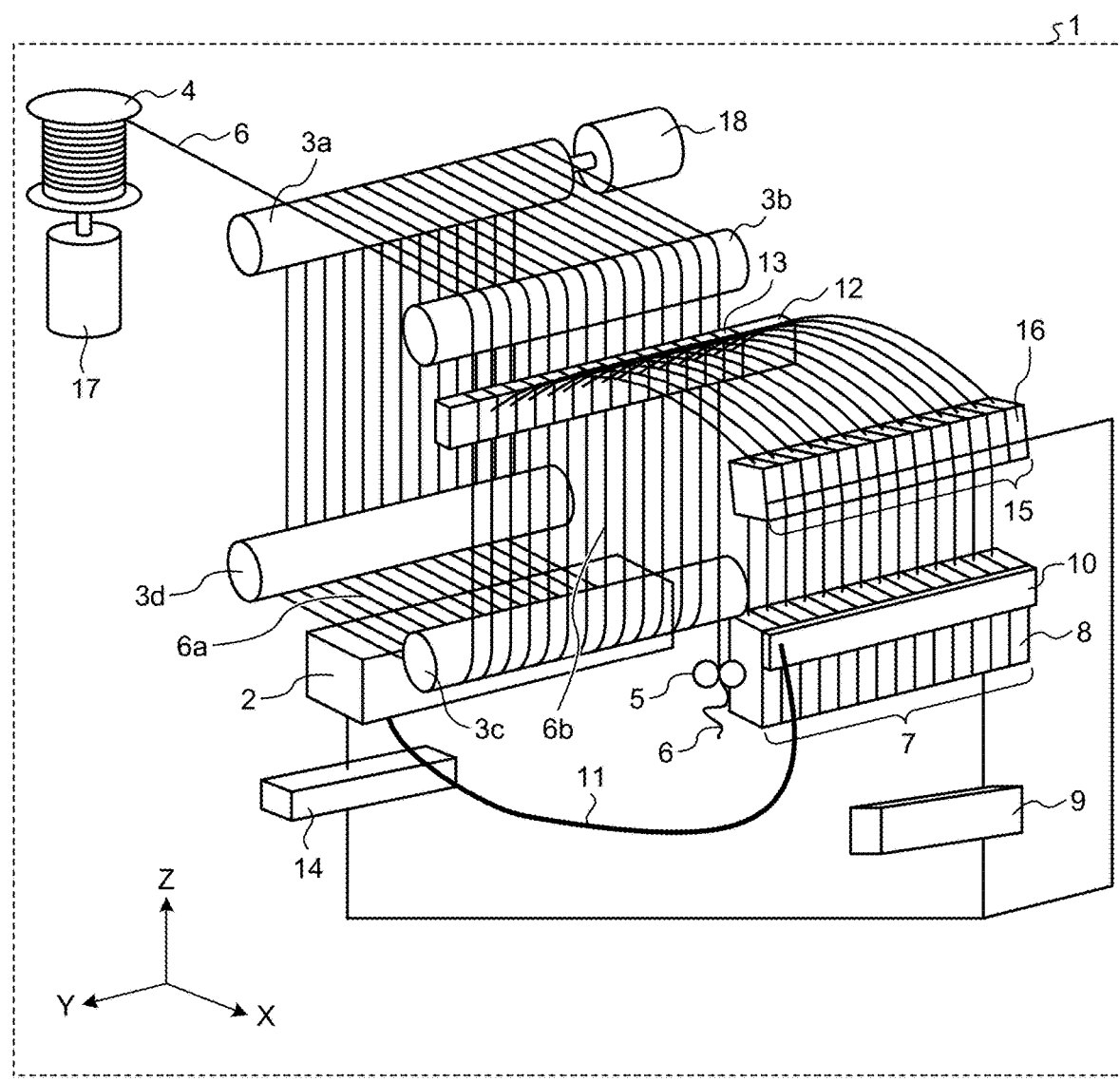
FIG. 1 is a diagram illustrating a configuration of a multiwire electric discharge machine according to a first embodiment.

FIG. 1 is a diagram illustrating a configuration of a multiwire electric discharge machine 1 according to a first embodiment. In the following description, an X-axis, a Y-axis, and a Z-axis are three axes perpendicular to each other. The Z-axis is a vertical axis. Of directions of each axis, a direction of an arrow is defined as a positive direction, and a direction opposite to the arrow is defined as a negative direction. A plus Z direction is defined as a vertically upward direction, and a minus Z direction is defined as a vertically downward direction.

The multiwire electric discharge machine 1 performs electric discharge machining of a workpiece 2 by causing a wire electrode 6 wound multiple times to travel and applying a voltage between each of a plurality of cutting wire sections 6a and the workpiece 2. The plurality of cutting wire sections 6a is sections of the wire electrode 6 traveling in parallel with each other. The multiwire electric discharge machine 1 manufactures a plurality of thin plates by simultaneously cutting the plurality of thin plates from the workpiece 2. The multiwire electric discharge machine 1 performs electric discharge machining while preventing the wire electrode 6 to be broken due to destabilization of a machining process or mechanical aging, by controlling a voltage to be applied by a machining power supply 7.

The multiwire electric discharge machine 1 includes a wire bobbin 4, a wire bobbin drive unit 17, wire ejection rollers 5, a plurality of guide rollers 3a, 3b, 3c, and 3d, and a guide roller drive unit 18. The wire bobbin 4 supplies the wire electrode 6. The wire bobbin drive unit 17 causes the wire bobbin 4 to rotate. The wire ejection rollers 5 eject the wire electrode 6 to the outside of the multiwire electric discharge machine 1. The plurality of guide rollers 3a, 3b, 3c, and 3d is for appropriately causing the wire electrode 6 to travel. The guide roller drive unit 18 drives the guide roller 3a. The wire electrode 6 is wound around the guide rollers 3a, 3b, 3c, and 3d multiple times at intervals. The guide rollers 3a, 3b, 3c, and 3d guide the traveling of the wire electrode 6 between the wire bobbin 4 and the wire ejection rollers 5.

The multiwire electric discharge machine 1 includes a power feeder 12 and a drive unit 14. The power feeder 12 supplies power to the wire electrode 6. The drive unit 14 drives a machining stage. The machining stage is not illustrated. A workpiece jig is disposed on the machining stage. The workpiece 2 is supported by the workpiece jig. The workpiece jig is not illustrated in FIG. 1. Details of the workpiece jig will be described below. The drive unit 14 moves the machining stage in a Z-axis direction which is a first direction. The first direction is a direction in which the workpiece 2 moves with respect to the plurality of cutting wire sections 6a, and is a direction in which the electric discharge machining of the workpiece 2 proceeds.

The multiwire electric discharge machine 1 includes the machining power supply 7, a cable 11, a machining control device 9, and a machining-state detection device 15. The cable 11 connects the machining power supply 7 and the workpiece jig. The machining control device 9 controls electric discharge machining. The machining-state detection device 15 detects a machining state. The machining power supply 7 applies a pulse voltage for machining between each cutting wire section 6a and the workpiece jig via the power feeder 12. That is, the machining power supply 7 applies the pulse voltage for machining between each of the plurality of cutting wire sections 6a and the workpiece 2. Hereinafter, the pulse voltage for machining is referred to as machining pulse voltage.

Each of the guide rollers 3a, 3b, 3c, and 3d has a cylindrical shape. The guide rollers 3a, 3b, 3c, and 3d have central axes parallel to each other, and are disposed away from each other. In FIG. 1, the central axis of each of the guide rollers 3a, 3b, 3c, and 3d is aligned with the Y-axis. In a plane perpendicular to each central axis, the central axes of the guide rollers 3a, 3b, 3c, and 3d are located at positions corresponding to apexes of a quadrangle. In FIG. 1, the plane perpendicular to each central axis corresponds to an XZ-plane.

Specifically, two of the four guide rollers 3a, 3b, 3c, and 3d, that is, the guide rollers 3a and 3b, are disposed above the other two guide rollers 3c and 3d. The guide roller 3c is located below the guide roller 3b. The guide roller 3d is located below the guide roller 3a. In the plane perpendicular to each central axis, a line connecting the central axis of the guide roller 3a and the central axis of the guide roller 3b and a line connecting the central axis of the guide roller 3c and the central axis of the guide roller 3d are aligned with the X-axis. In the plane perpendicular to each central axis, a line connecting the central axis of the guide roller 3b and the central axis of the guide roller 3c and a line connecting the central axis of the guide roller 3d and the central axis of the guide roller 3a are aligned with the Z-axis.

A plurality of guide grooves for guiding the traveling of the wire electrode 6 is formed in each of side surfaces of the guide rollers 3a, 3b, 3c, and 3d. The plurality of guide grooves is arranged on each of the guide rollers 3a, 3b, 3c, and 3d at regular intervals in a direction of the central axis. The wire electrode 6 fed from the wire bobbin 4 is wound around the guide rollers 3a, 3b, 3c, and 3d along the guide grooves in each of the guide rollers 3a, 3b, 3c, and 3d. The wire electrode 6 is wound around the guide rollers 3a, 3b, 3c, and 3d multiple times, and then ejected by the wire ejection rollers 5. When viewed from a plus Y direction side in FIG. 1, each of the guide rollers 3a, 3b, 3c, and 3d rotates clockwise.

Each of the plurality of cutting wire sections 6a is a section of the wire electrode 6 stretched between the guide roller 3c, which is a first guide roller, and the guide roller 3d, which is a second guide roller. The plurality of cutting wire sections 6a parallel to each other is provided between the guide roller 3c and the guide roller 3d. The plurality of cutting wire sections 6a refers to sections of the wire electrode 6 parallel to each other between the guide roller 3c and the guide roller 3d. In the first embodiment, a second direction, which is the traveling direction of the wire electrode 6 at the plurality of cutting wire sections 6a, corresponds to an X-axis direction.

In the example shown in FIG. 1, the guide roller drive unit 18 causes the guide roller 3a to rotate. In addition, the wire bobbin drive unit 17 causes the wire bobbin 4 to rotate in such a way as to keep the tension of the wire electrode 6 constant. The multiwire electric discharge machine 1 controls the wire bobbin drive unit 17 and the guide roller drive unit 18 such that the wire bobbin drive unit 17 causes the wire bobbin 4 to rotate and the guide roller drive unit 18 causes the guide roller 3a to rotate in such a way as to allow the wire electrode 6 to travel at a desired speed.

The machining-state detection device 15 detects a machining state at each cutting wire section 6a. The machining-state detection device 15 is installed on wires connecting the power feeder 12 and the machining power supply 7. The machining-state detection device 15 detects a machining state by monitoring, via the power feeder 12, gap voltage, current, the number of times an electric discharge occurs and the number of times a short circuit occurs per unit time, and machining pulse voltage, which is the output voltage of the machining power supply 7. The gap voltage is a voltage to be applied to an electrode gap, that is, a gap between the workpiece 2 and each cutting wire section 6a. The machining-state detection device 15 includes a plurality of machining-state detection units 16 such that there is a one-to-one correspondence between the machining-state detection units 16 and the cutting wire sections 6a. The machining-state detection device 15 detects a machining state of each cutting wire section 6a with corresponding one of the machining-state detection units 16.

The machining control device 9 generates a position command, that is, a feed control command value, based on the machining states detected by the machining-state detection device 15. The machining control device 9 outputs the position command to the drive unit 14. The drive unit 14 moves the machining stage in the Z-axis direction in accordance with the position command. As a result, a position of the workpiece 2 relative to each cutting wire section 6a is changed. The multiwire electric discharge machine 1 adjusts the relative distance between the workpiece 2 and each cutting wire section 6a by means of the drive unit 14.

The machining power supply 7 includes a plurality of machining power supply units 8 such that there is a one-to-one correspondence between the machining power supply units 8 and the cutting wire sections 6a. The machining control device 9 outputs a voltage application command to each machining power supply unit 8. Each machining power supply unit 8 applies a machining pulse voltage between corresponding one of the cutting wire sections 6a and the workpiece 2. The voltage application command includes each of command values such as the amplitude of voltage, the frequency of pulse voltage, and the on-pulse time of pulse voltage.

The machining control device 9 controls the relative distance between the workpiece 2 and each cutting wire section 6a by outputting a position command, and causes electric discharge between each cutting wire section 6a and the workpiece 2 by outputting a voltage application command. Thus, the multiwire electric discharge machine 1 cuts a plurality of thin plates from the workpiece 2.

The workpiece 2 is an ingot to be sliced into a plurality of thin plates. Examples of the workpiece 2 include metals such as tungsten and molybdenum serving as sputtering targets, and ceramics such as polycrystalline silicon carbide to be used as parts of various structures. The workpiece 2 may be single-crystal silicon which is a material of a semiconductor wafer, or may be a semiconductor material such as single-crystal silicon carbide, single-crystal gallium nitride, single-crystal gallium oxide, or single-crystal diamond. Alternatively, the workpiece 2 may be a solar cell material which is a material of a solar cell wafer, such as single-crystal silicon or polycrystalline silicon. The multiwire electric discharge machine 1 may be a multiwire electric discharge machine that manufactures a plurality of semiconductor wafers by cutting the plurality of semiconductor wafers from an ingot.

Among the materials cited as examples of the workpiece 2, metal has a sufficiently low specific resistance. Thus, metal can be applied to electric discharge machining with no problem. Meanwhile, semiconductor material and solar cell material with a sufficiently low specific resistance of about 100 Ωcm or less, desirably a specific resistance of 10 Ωcm or less, can be applied to electric discharge machining.

Therefore, metal is suitable for the workpiece 2. Semiconductor material or solar cell material with a specific resistance in the range from the specific resistance of metal to 100 Ωcm is suitable for the workpiece 2. Semiconductor material or solar cell material with a specific resistance in the range from the specific resistance of metal to 10 Ωcm is more suitable for the workpiece 2.

In the multiwire electric discharge machine 1, machining fluid is supplied to the electrode gap, that is, the gap between the workpiece 2 and each cutting wire section 6a. As in the case of a so-called single-type wire electric discharge machine, the machining fluid is supplied to the electrode gap by the spraying of the machining fluid or by immersion of the workpiece 2 in the machining fluid. A configuration for supplying the machining fluid is not illustrated.

The machining power supply 7 generates a machining pulse voltage to be applied to the electrode gap in accordance with the voltage application command from the machining control device 9. The machining power supply 7 generates a machining pulse voltage by, for example, a switching power supply system. The machining power supply 7 applies the machining pulse voltage separately to the plurality of cutting wire sections 6a by means of the plurality of machining power supply units 8. The machining power supply 7 includes a ground electrode 10 provided across the plurality of machining power supply units 8. A ground line of each machining power supply unit 8 is connected to the ground electrode 10. The ground electrode 10 is connected to the workpiece jig by the cable 11. The workpiece 2 is connected to the ground electrode 10 via the workpiece jig and the cable 11. Note that the machining power supply 7 can appropriately invert the polarity of machining pulse voltage to be generated, as necessary.

The power feeder 12 includes a plurality of power feeder units 13 insulated from each other. There is a one-to-one correspondence between the plurality of power feeder units 13 and power-supply wire sections 6b. In the example shown in FIG. 1, parallel sections of the wire electrode 6 between the guide roller 3b and the guide roller 3c correspond to a plurality of the power-supply wire sections 6b. Each power feeder unit 13 is slidably in contact with corresponding one of the power-supply wire sections 6b. Each power feeder unit 13 supplies, to corresponding one of the power-supply wire sections 6b, power supplied from corresponding one of the machining power supply units 8. The power feeder 12 supplies power separately to each of the plurality of power-supply wire sections 6b by means of the plurality of power feeder units 13. Thus, the machining pulse voltage is separately applied to each cutting wire section 6a by means of corresponding one of the machining power supply units 8.

Figure 2:
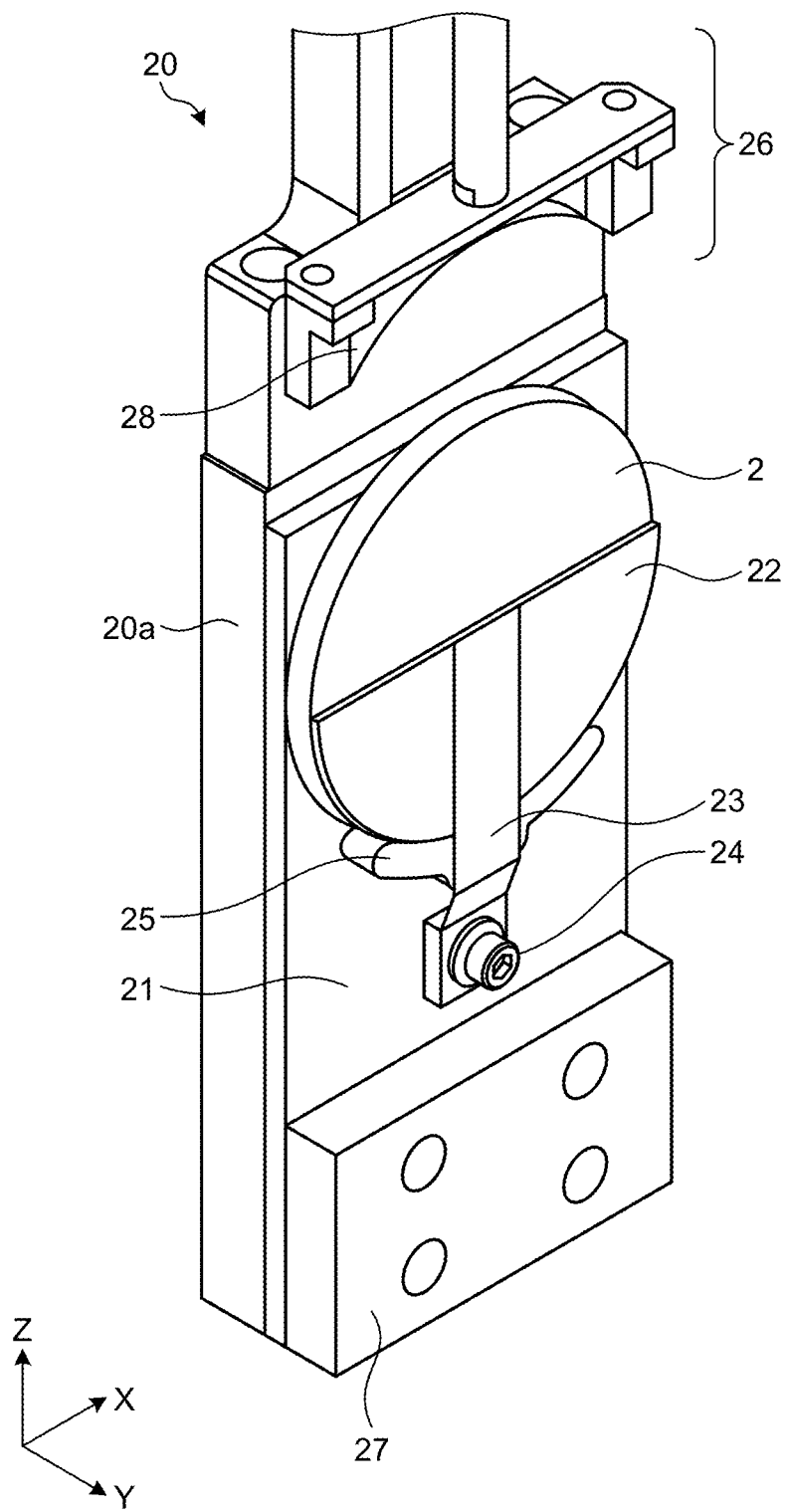
FIG. 2 is a perspective view of a workpiece jig included in the multiwire electric discharge machine according to the first embodiment.

Next, details of the workpiece jig will be described. FIG. 2 is a perspective view of a workpiece jig 20 included in the multiwire electric discharge machine 1 according to the first embodiment. The workpiece jig 20 supports the workpiece 2 during electric discharge machining. In the first embodiment, the workpiece 2 has a cylindrical shape. In FIG. 2, the workpiece 2 is placed on the workpiece jig 20 with the central axis of the cylinder aligned with the Y-axis. In FIG. 1, the shape of the workpiece 2 is different from the shape illustrated in FIG. 2 so as to make each constituent element of the multiwire electric discharge machine 1 easy to see.

The workpiece jig 20 includes a plate-shaped support 20a, a reference plate 21, a sub-plate 22, an energizing electrode 23, an electrode fixture 24, a dummy workpiece 25, a pressing mechanism 26, and a spacer 27. The reference plate 21 is attached to the support 20a. The pressing mechanism 26 is installed on the plus Z direction side of the support 20a. The support 20a is integrated with the reference plate 21 and the pressing mechanism 26. The support 20a supports the reference plate 21 and the pressing mechanism 26. The reference plate 21 is integrated with the electrode fixture 24, the dummy workpiece 25, and the spacer 27.

A first surface, which is one of two surfaces of the workpiece 2 perpendicular to the central axis thereof, is attached to a reference surface of the reference plate 21. The reference surface is a surface of the reference plate 21 opposite to the support 20a, that is, the XZ-plane of the reference plate 21 on the plus Y direction side. The electrode fixture 24, the dummy workpiece 25, and the spacer 27 are provided on the reference surface of the reference plate 21.

The dummy workpiece 25 is located on the minus Z direction side of the workpiece 2. The workpiece 2 is attached to the dummy workpiece 25. The dummy workpiece 25 supports the workpiece 2 from below. The dummy workpiece 25 is machined by the cutting wire sections 6a that have reached the dummy workpiece 25 during machining of the workpiece 2.

A second surface, which is the other of the two surfaces of the workpiece 2 perpendicular to the central axis thereof, is attached to the sub-plate 22. The workpiece 2 is attached to each of the reference plate 21, the sub-plate 22, and the dummy workpiece 25 by use of conductive adhesive, conductive wax, or the like. The workpiece 2 is attached to the reference plate 21, the sub-plate 22, and the dummy workpiece 25 to be integrated with the workpiece jig 20. The reference plate 21 and the sub-plate 22 hold the workpiece 2 such that the workpiece 2 is sandwiched between the reference plate 21 and the sub-plate 22.

An end of the energizing electrode 23 is fixed to the reference plate 21 by the electrode fixture 24 located below the dummy workpiece 25. Except for the end fixed by the electrode fixture 24, the energizing electrode 23 is in contact with the sub-plate 22 and the dummy workpiece 25. The energizing electrode 23 and the electrode fixture 24 are integrated with the sub-plate 22. The sub-plate 22 is electrically connected to the reference plate 21 via the energizing electrode 23 and the electrode fixture 24. An end of the cable 11 illustrated in FIG. 1 is connected to the energizing electrode 23. The energizing electrode 23 is electrically connected to the machining power supply 7 via the cable 11 and the ground electrode 10.

The pressing mechanism 26 includes a pressing portion 28 that can come into contact with a curved surface of the workpiece 2. The pressing mechanism 26 moves the pressing portion 28 in the Z-axis direction. In the workpiece jig 20, the dummy workpiece 25 supports the workpiece 2 from the minus Z direction side, which is one side in the first direction. After the machining of the workpiece 2 is started, the pressing mechanism 26 moves the pressing portion 28 in the minus Z direction to bring the pressing portion 28 into contact with the workpiece 2 from the plus Z direction side, which is another side in the first direction. Furthermore, the pressing mechanism 26 presses the workpiece 2 against the dummy workpiece 25 by means of the pressing portion 28. The machining control device 9 controls the driving of the pressing mechanism 26 by outputting a command to move the pressing portion 28. The pressing mechanism 26 moves the pressing portion 28 in accordance with the command sent from the machining control device 9.

The spacer 27 is provided below the electrode fixture 24 on the reference surface. The spacer 27 is a part provided so that when a plurality of the reference plates 21 is arranged in a Y-axis direction, a distance is kept between the reference plates 21.

Figure 3:
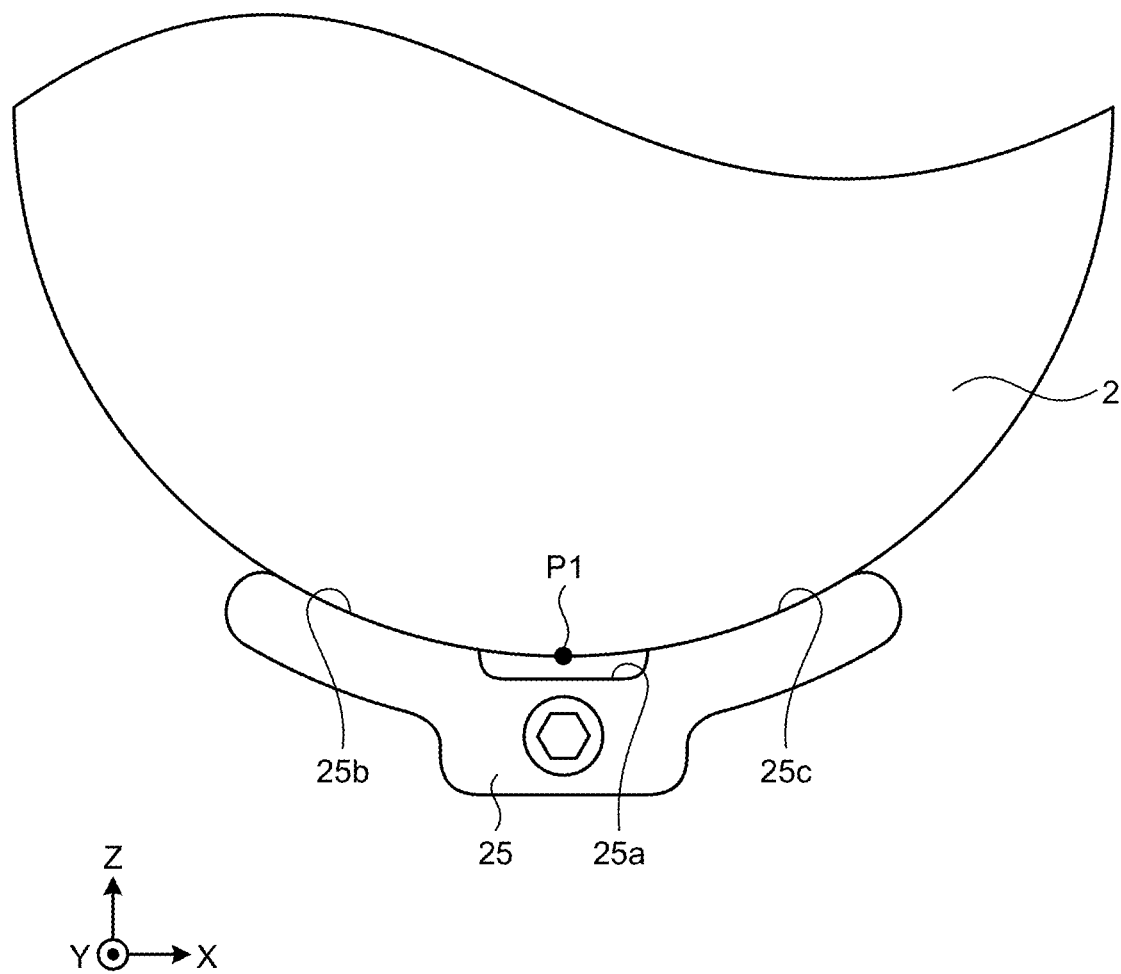
FIG. 3 is a plan view of a dummy workpiece included in the multiwire electric discharge machine according to the first embodiment.

Next, details of the dummy workpiece 25 will be described. FIG. 3 is a plan view of the dummy workpiece 25 included in the multiwire electric discharge machine 1 according to the first embodiment. FIG. 3 illustrates the dummy workpiece 25 and a portion of the workpiece 2 in contact with the dummy workpiece 25.

An end of the curved surface of the workpiece 2 in the minus Z direction is a point to be machined last on the workpiece 2. Hereinafter, the point is referred to as an end point P1. The end point P1 is a point to be reached by each of the plurality of cutting wire sections 6a at the end of machining of the workpiece 2. The outer shape of the dummy workpiece 25 is curved on the plus Z direction side, along the curved surface of the workpiece 2. A recess 25a recessed in the minus Z direction is formed in the curved portion of the dummy workpiece 25. The recess 25a is located in the center of the curved portion in the X-axis direction. The recess 25a is formed at a position facing a part of the curved surface of the workpiece 2, the part of the curved surface including the end point P1.

A contact surface 25b comes into contact with the curved surface of the workpiece 2. The contact surface 25b is a portion of the curved portion of the dummy workpiece 25 on a minus X direction side of the recess 25a. A contact surface 25c comes into contact with the curved surface of the workpiece 2. The contact surface 25c is a portion of the curved portion of the dummy workpiece 25 on a plus X direction side of the recess 25a. Each of the two contact surfaces 25b and 25c is a contact surface curved in such a way as to be capable of coming into contact with the curved surface of the workpiece 2 except for the end point P1. The contact surface 25b and the contact surface 25c are provided adjacent to the recess 25a. The workpiece 2 is supported by the dummy workpiece 25 in a state where the end point P1 on the workpiece 2 is not in contact with the dummy workpiece 25 and the workpiece 2 except for the end point P1 is in contact with the contact surfaces 25b and 25c.

The dummy workpiece 25 is made of material capable of being machined by electric discharge machining. Preferably, the material of the dummy workpiece 25 is a material having machining characteristics equivalent to those of the workpiece 2.

Since the dummy workpiece 25 has the contact surfaces 25b and 25c curved in such a way as to be capable of coming into contact with the curved surface of the workpiece 2, the areas of regions of the workpiece 2 in contact with the dummy workpiece 25 can be increased. As a result, the multiwire electric discharge machine 1 can increase strength for holding the workpiece 2.

Next, details of the pressing portion 28 will be described. When pressed against the curved surface of the workpiece 2 by the driving of the pressing mechanism 26, the pressing portion 28 is desirably deformed in accordance with the shape of the workpiece 2. Specifically, a stainless steel plate with a thickness of 0.3 mm or less, or a material such as a urethane sponge material, a gel-like material, or a thermoplastic resin can be applied as the pressing portion 28. Since the pressing portion 28 can be deformed in accordance with the shape of the workpiece 2, the areas of regions of the workpiece 2 in contact with the pressing portion 28 can be increased. As a result, the multiwire electric discharge machine 1 can increase strength for holding the workpiece 2. Note that the material or configuration of the pressing portion 28 is not limited to the material or configuration described in the first embodiment as long as the pressing portion 28 can be deformed in accordance with the shape of the workpiece 2.

Figure 4:
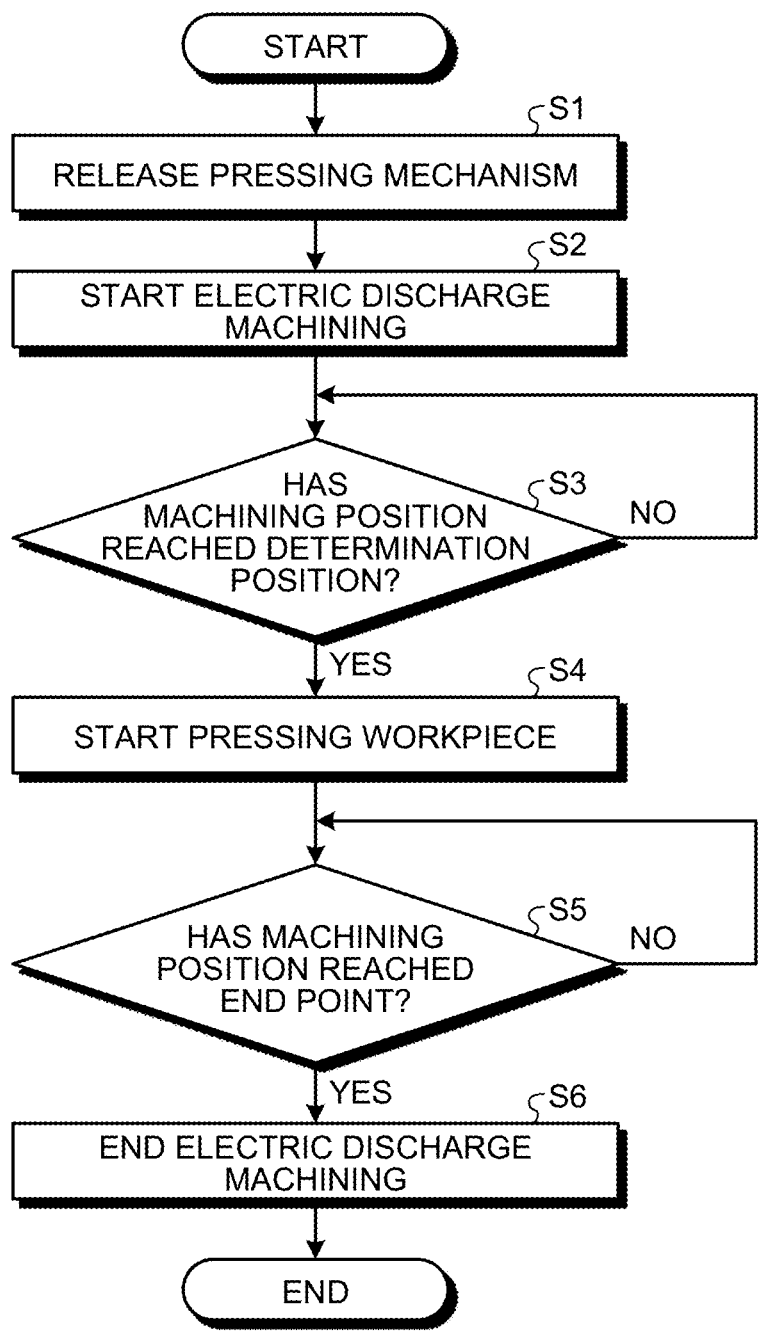
FIG. 4 is a flowchart illustrating an operation procedure of the multiwire electric discharge machine according to the first embodiment.

Next, operation of the multiwire electric discharge machine 1 will be described. FIG. 4 is a flowchart illustrating an operation procedure of the multiwire electric discharge machine 1 according to the first embodiment. Before the multiwire electric discharge machine 1 starts operation according to the procedure illustrated in FIG. 4, the workpiece jig 20 on which the workpiece 2 has been set is disposed on the machining stage.

In step S1, the multiwire electric discharge machine 1 releases the pressing mechanism 26 by detaching the pressing portion 28 from the workpiece 2 in the plus Z direction. At this time, the workpiece 2 is supported by the dummy workpiece 25 on the minus Z direction side, and is not supported on the plus Z direction side.

Figure 5:
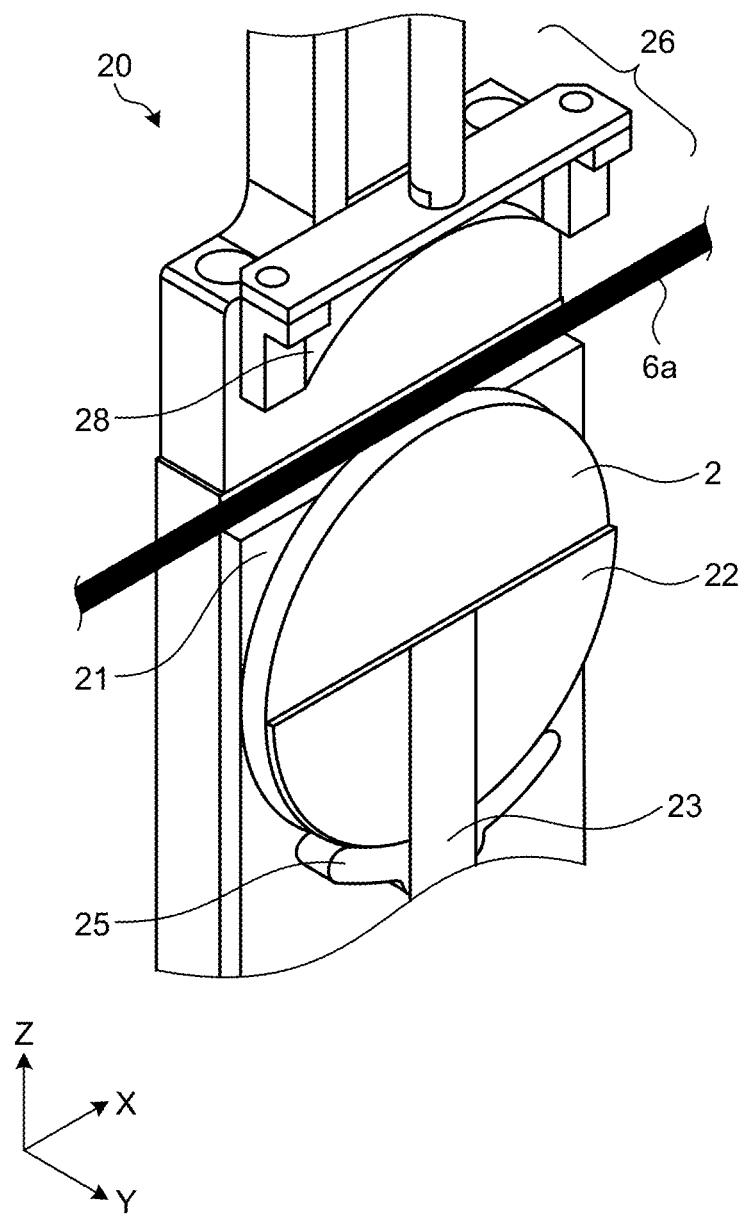
FIG. 5 is a perspective view of the workpiece jig and a plurality of cutting wire sections, which illustrates states of the workpiece jig and the plurality of cutting wire sections in the multiwire electric discharge machine according to the first embodiment that has started electric discharge machining.

In step S2, the multiwire electric discharge machine 1 starts electric discharge machining of the workpiece 2. FIG. 5 is a perspective view of the workpiece jig 20 and the plurality of cutting wire sections 6a, which illustrates states of the workpiece jig 20 and the plurality of cutting wire sections 6a in the multiwire electric discharge machine 1 according to the first embodiment that has started electric discharge machining. An end of the curved surface of the workpiece 2 on the plus Z direction side is a point at which machining is started by the plurality of cutting wire sections 6a, that is, a point on the workpiece 2 at which machining is first performed. Hereinafter, the point is referred to as a start point. The multiwire electric discharge machine 1 performs machining of the workpiece 2 by applying a machining pulse voltage to the electrode gap while moving the machining stage in the plus Z direction. A machining position on the workpiece 2 moves from the start point in the minus Z direction.

In step S3, the multiwire electric discharge machine 1 determines whether the machining position has reached a determination position. The determination position is a position set in advance on the curved surface of the workpiece 2, and is a position for determining whether the workpiece 2 may be pressed by the pressing mechanism 26. When the machining position has not reached the determination position (step S3, No), the multiwire electric discharge machine 1 repeats step S3 while continuing electric discharge machining. Meanwhile, when the machining position has reached the determination position (step S3, Yes), the process proceeds to step S4 in the multiwire electric discharge machine 1.

Figure 6:
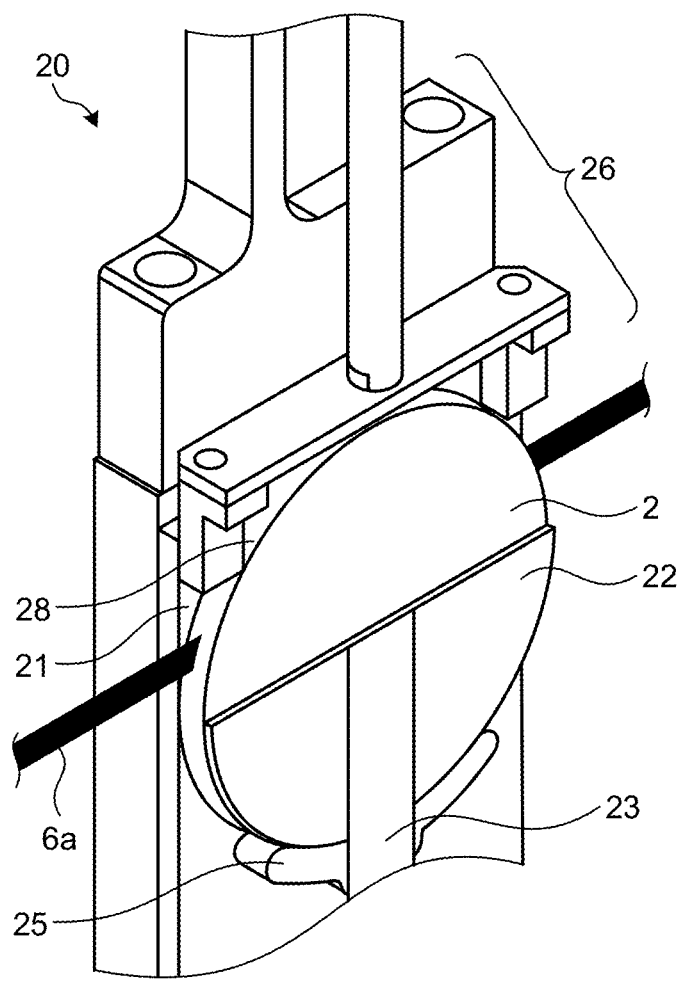
FIG. 6 is a perspective view of the workpiece jig and the plurality of cutting wire sections, which illustrates states of the workpiece jig and the plurality of cutting wire sections in the multiwire electric discharge machine according to the first embodiment that has started to press the workpiece.

In step S4, the multiwire electric discharge machine 1 causes the pressing mechanism 26 to start pressing the workpiece 2. FIG. 6 is a perspective view of the workpiece jig 20 and the plurality of cutting wire sections 6a, which illustrates states of the workpiece jig 20 and the plurality of cutting wire sections 6a in the multiwire electric discharge machine 1 according to the first embodiment that has started to press the workpiece 2. The pressing mechanism 26 brings the contact surfaces 25b and 25c into contact with the curved surface of the workpiece 2 by moving the pressing portion 28 in the minus Z direction. Furthermore, the pressing mechanism 26 presses the workpiece 2 against the dummy workpiece 25 by pressing the workpiece 2 in the minus Z direction with the pressing portion 28. As a result, the workpiece 2 is supported in a state of being sandwiched between the dummy workpiece 25 and the pressing portion 28. The multiwire electric discharge machine 1 performs machining of a portion on the minus Z direction side with respect to the determination position.

In step S5, the multiwire electric discharge machine 1 determines whether the machining position has reached the end point P1. When the machining position has not reached the end point P1 (step S5, No), the multiwire electric discharge machine 1 repeats step S5 while continuing electric discharge machining. Meanwhile, when the machining position has reached the end point P1 (step S5, Yes), the multiwire electric discharge machine 1 ends electric discharge machining in step S6. Thus, the multiwire electric discharge machine 1 ends the operation according to the procedure illustrated in FIG. 4.

When the electric discharge machining of the workpiece 2 proceeds to some extent, the multiwire electric discharge machine 1 causes the workpiece 2 being machined to be sandwiched between the pressing portion 28 and the dummy workpiece 25. The multiwire electric discharge machine 1 can prevent vibration at a portion at which the workpiece 2 is to be cut into separate portions, by causing the machining fluid to apply an external force to the workpiece 2. Thus, the multiwire electric discharge machine 1 can prevent cracking of the workpiece 2.

After the pressing of the workpiece 2 is started by the pressing mechanism 26, electric discharge machining proceeds, until the plurality of cutting wire sections 6*a* reaches the dummy workpiece 25. When the plurality of cutting wire sections 6*a* reaches the dummy workpiece 25, machining of the dummy workpiece 25 is started while the machining of the workpiece 2 is continuing. When the plurality of cutting wire sections 6*a* approaches the end point P1 of the workpiece 2 and reaches the recess 25*a*, the dummy workpiece 25 stops being machined, and only the workpiece 2 is machined. When the plurality of cutting wire sections 6*a* reaches the end point P1, the machining of the workpiece 2 ends.

The recess 25*a* is provided in the dummy workpiece 25, and the dummy workpiece 25 comes into contact with the workpiece 2 except for the end point P1. As a result, the amount of machining of the dummy workpiece 25 does not rapidly increase when the machining position reaches the end point P1. Therefore, the multiwire electric discharge machine 1 can prevent the amount of machining of the workpiece 2 from locally increasing. As a result, it is possible to make the workpiece 2 less likely to be cracked.

Figure 7:
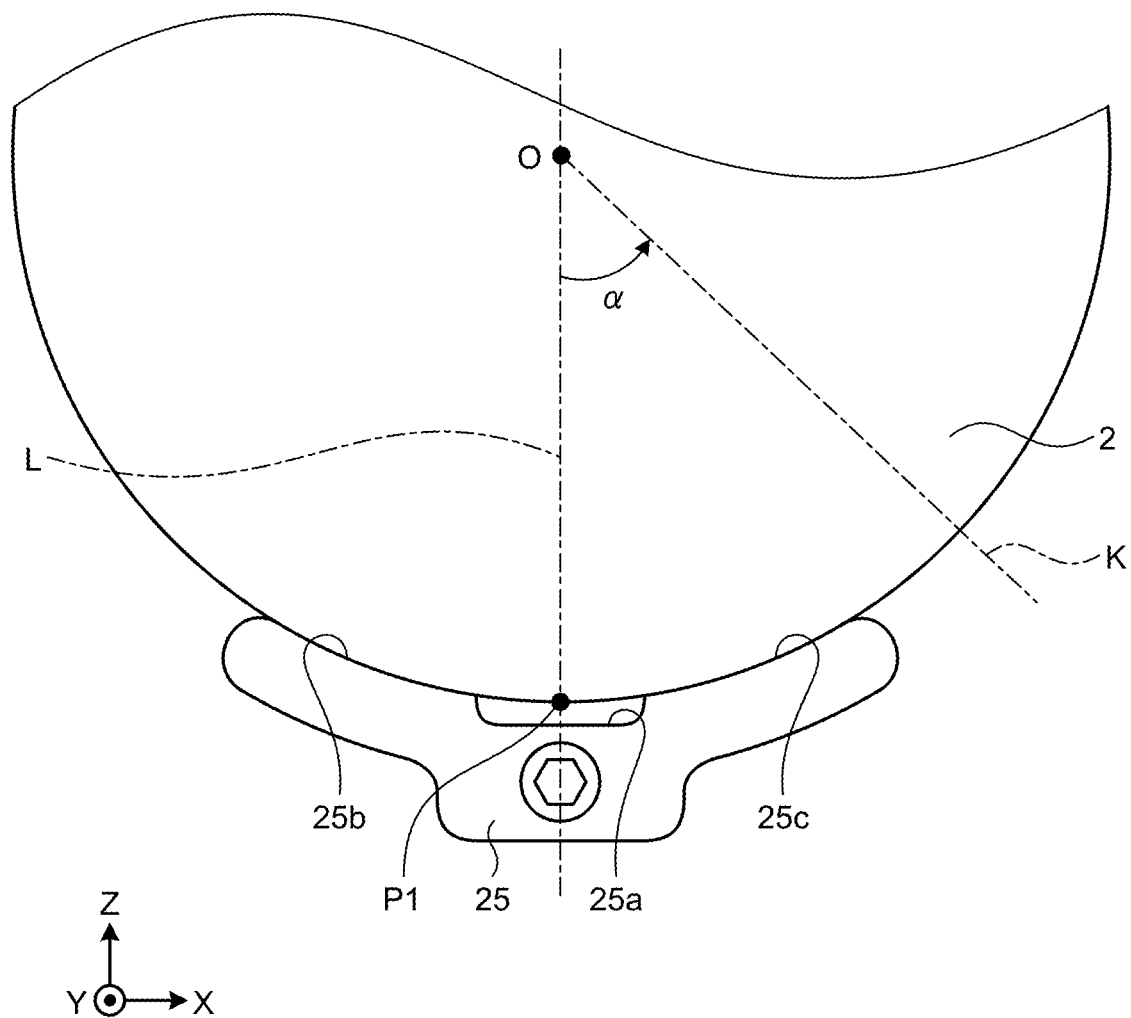
FIG. 7 is a plan view of the dummy workpiece for describing ranges of contact surfaces of the dummy workpiece of the first embodiment.

Next, ranges of the contact surfaces 25*b* and 25*c* of the dummy workpiece 25 will be described. FIG. 7 is a plan view of the dummy workpiece 25 for describing ranges of the contact surfaces 25*b* and 25*c* of the dummy workpiece 25 of the first embodiment.

The wider the regions of the workpiece 2 in contact with the dummy workpiece 25, the larger the frictional force between the workpiece 2 and the dummy workpiece 25, and the higher the binding force of the workpiece 2. Meanwhile, as the regions of the workpiece 2 in contact with the dummy workpiece 25 becomes wider, a portion of the workpiece 2 to be machined together with the dummy workpiece 25 increases. Therefore, it is desirable to minimize the amount of machining of the dummy workpiece 25 while maintaining the frictional force between the workpiece 2 and the dummy workpiece 25 to some extent.

A straight line L illustrated in FIG. 7 is a straight line in the XZ-plane, and is a straight line passing through a center O and the end point P1 of the workpiece 2 in the XZ-plane. The straight line L is a straight line passing through the end point P1 in the Z-axis direction. A straight line K is a straight line in the XZ-plane, and is a straight line passing through the center O and any desired point other than the end point P1 on a circle that is an outer edge of the workpiece 2 in the XZ-plane. An angle $\alpha$ is an angle with respect to the straight line L, and is an angle formed by the straight line L and the straight line K. An angle between the straight line L and the straight line K located in a counterclockwise direction with respect to the straight line L is defined as a positive angle. Meanwhile, an angle between the straight line L and the straight line K located in a clockwise direction with respect to the straight line L is defined as a negative angle. The angle $\alpha$ is an angle in the range from −180 degrees to +180 degrees.

In the first embodiment, in order to maintain the frictional force between the workpiece 2 and the dummy workpiece 25 and reduce the amount of machining of the dummy workpiece 25, the contact surfaces 25*b* and 25*c* are formed such that the angle $\alpha$ is in the range from −45 degrees to +45 degrees. Thus, on the XZ-plane including the Z-axis and the X-axis, the contact surfaces 25*b* and 25*c* are disposed in such a way as to be capable of coming into contact with the curved surface of the workpiece 2 within the range of 45 degrees in either direction with respect to the straight line L. In addition, the recess 25*a* is formed in a certain range with the end point P1, which is a position where the angle $\alpha$ is 0 degrees, located in the center. The contact surfaces 25*b* and 25*c* are disposed such that the contact surfaces 25*b* and 25*c* are not located in the range with the end point P1 located in the center.

Figure 8:
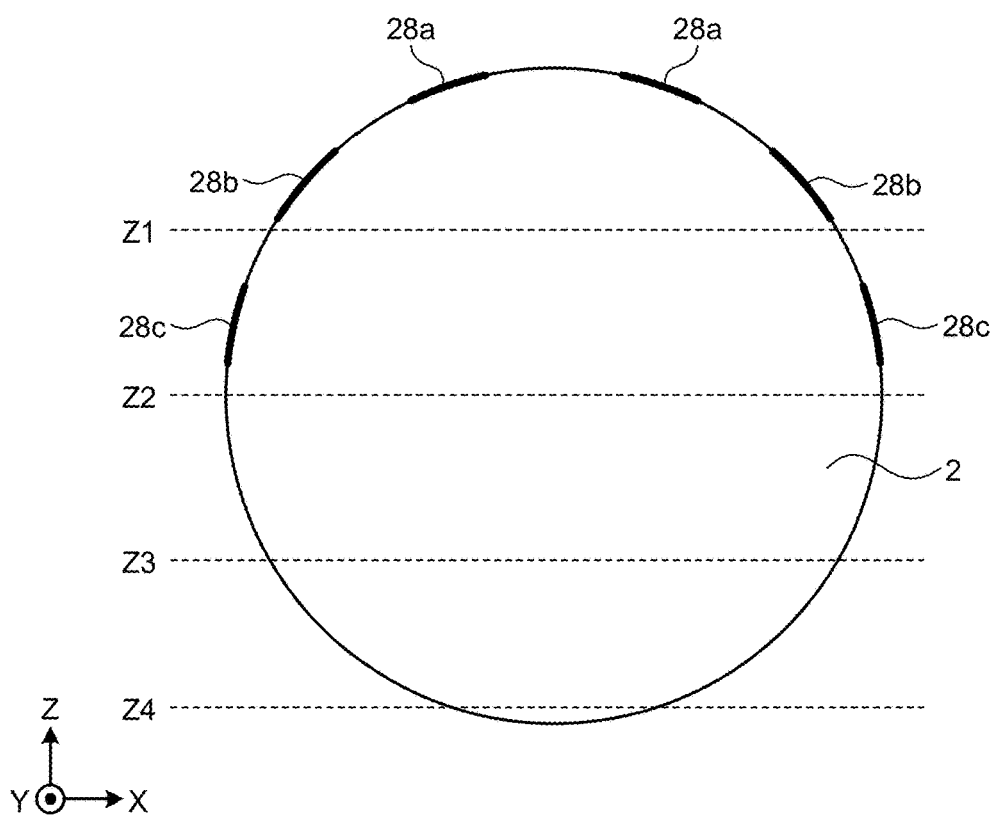
FIG. 8 is a first diagram for describing the relationship between regions of the workpiece in contact with a pressing portion and principal stress to be applied to the workpiece in the first embodiment.
Figure 9:
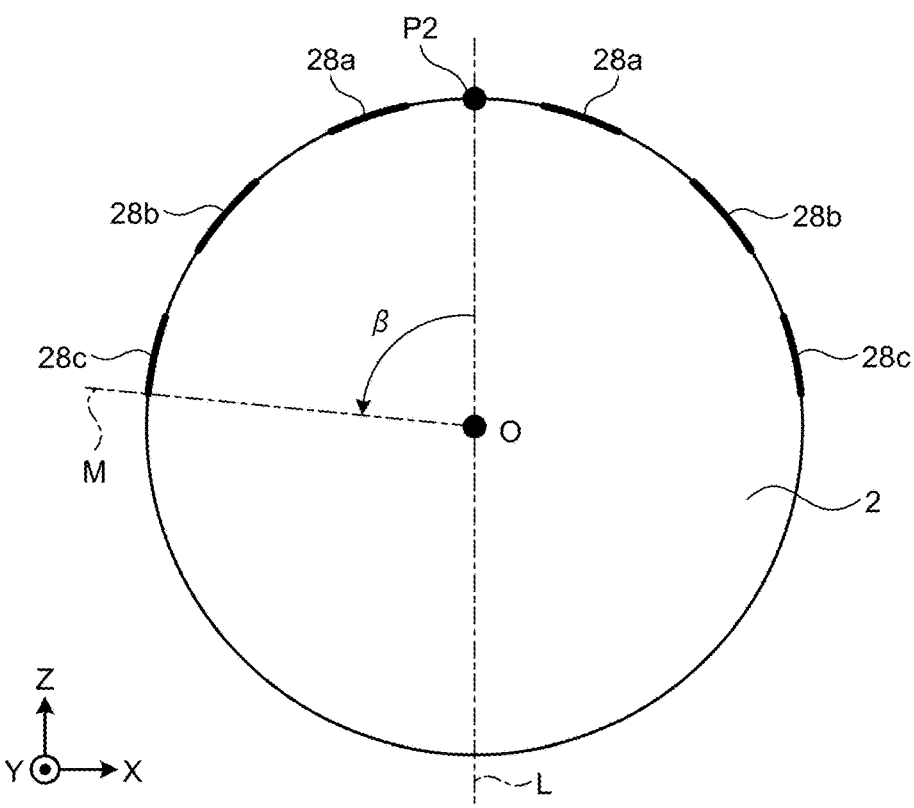
FIG. 9 is a second diagram for describing the relationship between the regions of the workpiece in contact with the pressing portion and principal stress to be applied to the workpiece in the first embodiment.
Figure 10:
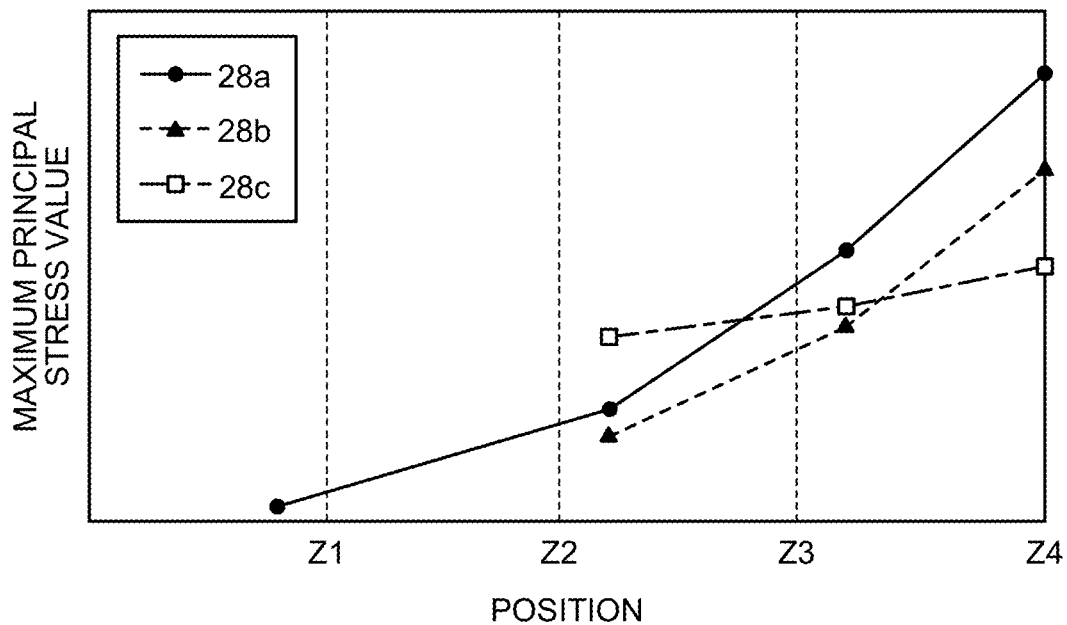
FIG. 10 is a third diagram for describing the relationship between the regions of the workpiece in contact with the pressing portion and principal stress to be applied to the workpiece in the first embodiment.

Next, a description will be given of the relationship between regions of the workpiece 2 in contact with the pressing portion 28 and principal stress to be applied to the workpiece 2. FIG. 8 is a first diagram for describing the relationship between regions of the workpiece 2 in contact with the pressing portion 28 and principal stress to be applied to the workpiece 2 in the first embodiment. FIG. 9 is a second diagram for describing the relationship between the regions of the workpiece 2 in contact with the pressing portion 28 and principal stress to be applied to the workpiece 2 in the first embodiment. FIG. 10 is a third diagram for describing the relationship between the regions of the workpiece 2 in contact with the pressing portion 28 and principal stress to be applied to the workpiece 2 in the first embodiment.

The wider the regions of the workpiece 2 in contact with the pressing portion 28, the larger the frictional force between the workpiece 2 and the pressing portion 28, and the higher the binding force of the workpiece 2. Meanwhile, as the regions of the workpiece 2 in contact with the pressing portion 28 becomes wider, the length of the workpiece 2 to be cut before the pressing portion 28 starts to press the workpiece 2 increases. Depending on the setting of the regions in contact with the pressing portion 28, the principal stress applied to the workpiece 2 may reach a maximum tensile stress of the workpiece 2 to crack the workpiece 2. Therefore, it is necessary to set the regions in contact with the pressing portion 28 such that the principal stress to be applied to the workpiece 2 constantly falls below the maximum tensile stress while the electric discharge machining of the workpiece 2 is being performed.

A region 28*a*, a region 28*b*, and a region 28*c* illustrated in FIGS. 8 and 9 are regions different from each other on the curved surface of the workpiece 2. As illustrated in FIGS. 8, 21, 22, 23, and 24 denote positions in the Z-axis direction. The graphs illustrated in FIG. 10 show results of analyzing the relationship between machining positions and maximum principal stress values. FIG. 10 illustrates a graph for a case where the pressing portion 28 is brought into contact with the region 28*a*, a graph for a case where the pressing portion 28 is brought into contact with the region 28*b*, and a graph for a case where the pressing portion 28 is brought into contact with the region 28*c*.

When the pressing portion 28 is brought into contact with the region 28*a*, the maximum principal stress value significantly increases as machining proceeds. An increase in the maximum principal stress value is smaller in the case where the pressing portion 28 is brought into contact with the region 28b than in the case where the pressing portion 28 is brought into contact with the region 28a. Furthermore, an increase in the maximum principal stress value is smaller in the case where the pressing portion 28 is brought into contact with the region 28c than in the case where the pressing portion 28 is brought into contact with the region 28b. When the pressing portion 28 is brought into contact with the region 28c among the region 28a, the region 28b, and the region 28c, the maximum principal stress value increases least rapidly. Therefore, it is possible to reduce cracks in the workpiece 2 by bringing the pressing portion 28 into contact with the region 28c among the region 28a, the region 28b, and the region 28c.

The straight line L illustrated in FIG. 9 is the same as the straight line L illustrated in FIG. 7. The straight line L passes through a start point P2. A straight line M is a straight line in the XZ-plane, and is a straight line passing through the center O and any desired point other than the start point P2 on the circle that is the outer edge of the workpiece 2 in the XZ-plane. An angle β is an angle with respect to the straight line L, and is an angle formed by the straight line L and the straight line M. An angle between the straight line L and the straight line M located in the counterclockwise direction with respect to the straight line L is defined as a positive angle. Meanwhile, an angle between the straight line L and the straight line M located in the clockwise direction with respect to the straight line L is defined as a negative angle. The angle β is an angle in the range from −180 degrees to +180 degrees.

In the first embodiment, the pressing portion 28 is formed at the angle β in the range from −75 degrees to +75 degrees such that the frictional force between the workpiece 2 and the pressing portion 28 is maintained and the principal stress to be applied to the workpiece 2 constantly falls below the maximum tensile stress. Thus, on the XZ-plane, the pressing portion 28 is disposed in such a way as to be capable of coming into contact with the curved surface of the workpiece 2 within the range of 75 degrees in either direction with respect to the straight line L.

Figure 11:
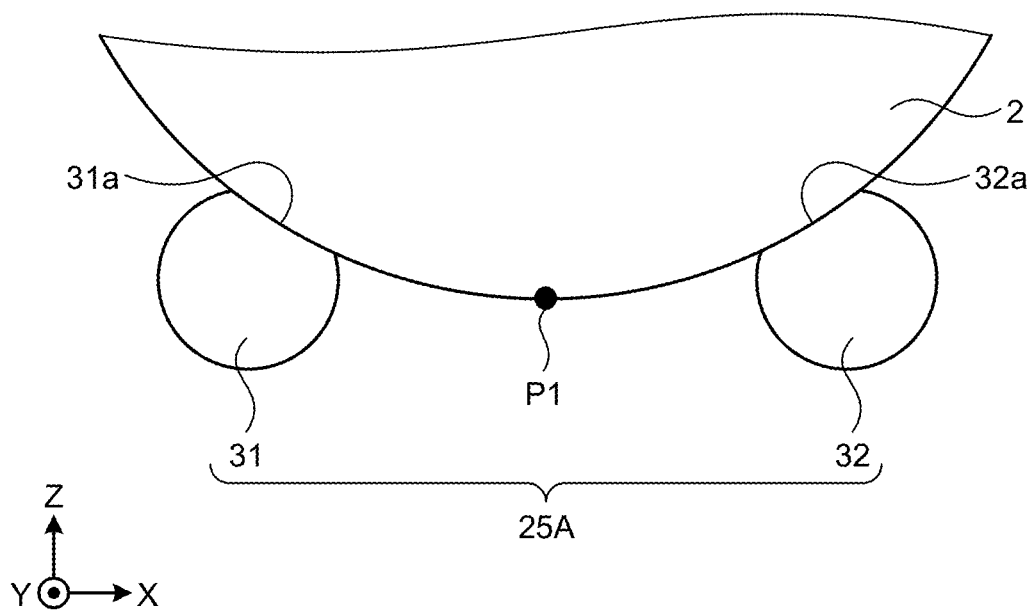
FIG. 11 is a plan view of a dummy workpiece according to a modification of the first embodiment.

Next, a modification of the dummy workpiece will be described. FIG. 11 is a plan view of a dummy workpiece 25A according to a modification of the first embodiment. FIG. 11 illustrates the dummy workpiece 25A and a portion of the workpiece 2 in contact with the dummy workpiece 25A. The dummy workpiece 25A supports the workpiece 2 from below.

The dummy workpiece 25A includes two parts 31 and 32. The part 31 and the part 32 are disposed in such a way as to be capable of coming into contact with the curved surface of the workpiece 2 except for the end point P1. The part 31 comes into contact with a portion on the minus X direction side with respect to the end point P1. A contact surface 31a of the part 31 comes into contact with the workpiece 2. The contact surface 31a is curved along the curved surface of the workpiece 2. The part 32 comes into contact with a portion on the plus X direction side with respect to the end point P1. A contact surface 32a of the part 32 comes into contact with the workpiece 2. The contact surface 32a is curved along the curved surface of the workpiece 2. Each of the contact surface 31a and the contact surface 32a is a contact surface curved in such a way as to be capable of coming into contact with the curved surface of the workpiece 2 except for the end point P1.

The workpiece 2 is supported by the dummy workpiece 25A in a state where the end point P1 on the workpiece 2 is not in contact with the dummy workpiece 25A and the workpiece 2 except for the end point P1 is in contact with the contact surfaces 31a and 32a. The parts 31 and 32 are made of material capable of being machined by electric discharge machining. Desirably, the material of the parts 31 and 32 is a material having machining characteristics equivalent to those of the workpiece 2.

Since the contact surfaces 31a and 32a of the parts 31 and 32 are curved in such a way as to be capable of coming into contact with the curved surface of the workpiece 2, respectively, the areas of regions of the workpiece 2 in contact with the dummy workpiece 25A can be increased. As a result, the multiwire electric discharge machine 1 can increase strength for holding the workpiece 2. Since the dummy workpiece 25A includes the plurality of parts 31 and 32, the dummy workpiece 25A can be formed in a simple shape.

A space is formed below the end point P1, that is, between the part 31 and the part 32. When the machining position reaches the end point P1, the amount of machining of the dummy workpiece 25A does not rapidly increase. Therefore, the multiwire electric discharge machine 1 can prevent the amount of machining of the workpiece 2 from locally increasing. As a result, it is possible to make the workpiece 2 less likely to be cracked. The positions of the contact surfaces 31a and 32a can be set in the same manner as the contact surfaces 25b and 25c described above.

Note that the dummy workpiece 25A is not limited to one including the two parts 31 and 32, and may be one including three or more parts. The dummy workpiece 25A just needs to include two or more parts that can come into contact with the curved surface of the workpiece 2 except for the end point P1. Each of the parts includes a contact surface curved in such a way as to be capable of coming into contact with the curved surface of the workpiece 2 except for the end point P1.

Figure 12:
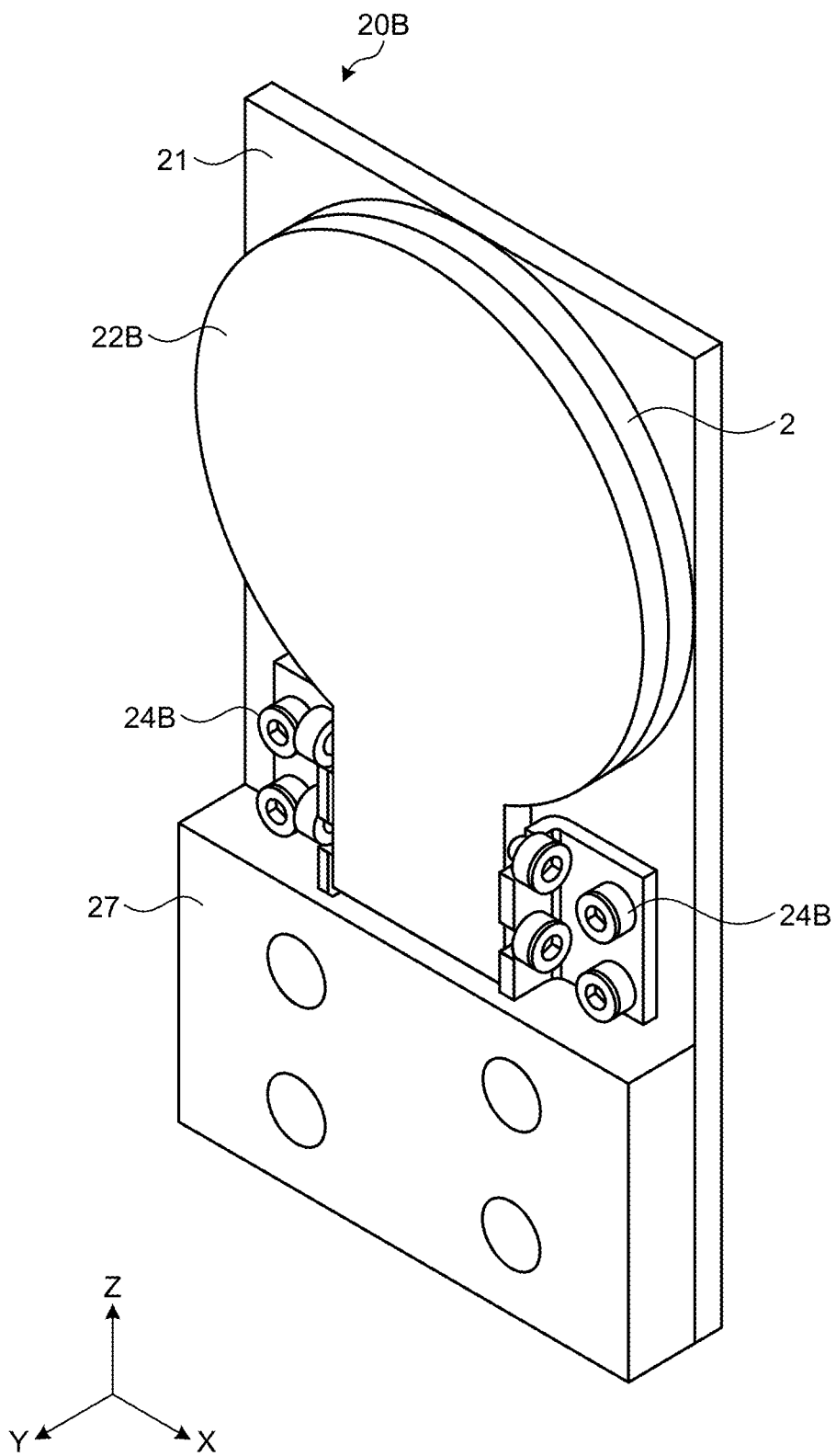
FIG. 12 is a perspective view of a workpiece jig according to a modification of the first embodiment.

Next, a modification of the workpiece jig will be described. FIG. 12 is a perspective view of a workpiece jig 20B according to a modification of the first embodiment. The workpiece jig 20B includes a sub-plate 22B instead of the sub-plate 22 illustrated in FIG. 2. The sub-plate 22B is different from the sub-plate 22. The sub-plate 22B has both the functions of the sub-plate 22 and the energizing electrode 23. The sub-plate 22B is fixed to the reference plate 21 by a plurality of electrode fixtures 24B. It is possible to improve strength for holding the sub-plate 22B by using the plurality of electrode fixtures 24B. Even when the multiwire electric discharge machine 1 includes the workpiece jig 20B, the multiwire electric discharge machine 1 can hold the workpiece 2 as in the case of including the workpiece jig 20.

According to the first embodiment, the multiwire electric discharge machine 1 includes the dummy workpiece 25 or 25A and the pressing mechanism 26, so that the workpiece 2 can be held with a strong holding force. The multiwire electric discharge machine 1 can prevent vibration at a portion at which the workpiece 2 is to be cut into separate portions, and can reduce cracks in the workpiece 2. Since the dummy workpieces 25 and 25A come into contact with the workpiece 2 except for the end point P1, the amounts of machining of the dummy workpieces 25 and 25A do not rapidly increase when the machining position reaches the end point P1. The multiwire electric discharge machine 1 can prevent the amount of machining of the workpiece 2 from locally increasing. As a result, it is possible to make the workpiece 2 less likely to be cracked. As described above, the multiwire electric discharge machine 1 has an effect of enabling cracks in the workpiece 2 to be reduced.

The configurations set forth in the above embodiment are examples of the subject matter of the present disclosure. The configurations of the embodiment can be combined with another known technique. It is possible to partially omit or change the configurations of the embodiment without departing from the scope of the present disclosure.

REFERENCE SIGNS LIST 1 multiwire electric discharge machine; 2 workpiece; 3a, 3b, 3c, 3d guide roller; 4 wire bobbin; 5 wire ejection roller; 6 wire electrode; 6a cutting wire section; 6b power-supply wire section; 7 machining power supply; 8 machining power supply unit; 9 machining control device; 10 ground electrode; 11 cable; 12 power feeder; 13 power feeder unit; 14 drive unit; 15 machining-state detection device; 16 machining-state detection unit; 17 wire bobbin drive unit; 18 guide roller drive unit; 20, 20B workpiece jig; 20a support; 21 reference plate; 22, 22B sub-plate; 23 energizing electrode; 24, 24B electrode fixture; 25, 25A dummy workpiece; 25a recess; 25b, 25c, 31a, 32a contact surface; 26 pressing mechanism; 27 spacer; 28 pressing portion; 28a, 28b, 28c region; 31, 32 part.

The invention claimed is:

1. A multiwire electric discharge machine comprising:
  a wire electrode comprising a plurality of wire cutting sections;
  a plurality of guide rollers comprising a first guide roller and a second guide roller, the plurality of guide rollers being for guiding traveling of the wire electrode, the wire electrode being wound around the plurality of guide rollers multiple times at intervals;
  a machining power supply to apply a voltage between each of the plurality of cutting wire sections and a workpiece having a curved surface, the plurality of cutting wire sections being parallel sections of the wire electrode between the first guide roller and the second guide roller;
  a dummy workpiece including a contact surface, the contact surface being curved in such a way as to be capable of coming into contact with the curved surface of the workpiece except for an end point of the workpiece, the end point of the workpiece being to be reached by each of the plurality of cutting wire sections when machining of the workpiece is completed, the dummy workpiece supporting the workpiece from one side in a first direction, the first direction being a direction in which the workpiece moves with respect to the plurality of cutting wire sections; and
  a pressing mechanism including a pressing portion capable of coming into contact with the curved surface of the workpiece, the pressing mechanism pressing the workpiece against the dummy workpiece by bringing the pressing portion into direct contact with the workpiece from a side opposite to the dummy workpiece.

2. The multiwire electric discharge machine according to claim 1, comprising:
  a reference plate integrated with the dummy workpiece and the pressing mechanism; and
  a sub-plate integrated with an energizing electrode and electrically connected to the reference plate, the energizing electrode being electrically connected to the machining power supply, wherein
  the reference plate and the sub-plate hold the workpiece such that the workpiece is sandwiched between the reference plate and the sub-plate.

3. The multiwire electric discharge machine according to claim 1, wherein
  the dummy workpiece has a recess formed at a position facing a part of the curved surface of the workpiece, the part of the curved surface of the workpiece including the end point of the workpiece, and
  the contact surface of the dummy workpiece is provided adjacent to the recess.

4. The multiwire electric discharge machine according to claim 1, wherein
  the dummy workpiece includes two or more parts capable of coming into contact with the curved surface of the workpiece except for the end point of the workpiece, and
  each of the parts of the dummy workpiece includes the contact surface.

5. The multiwire electric discharge machine according to claim 1,
  wherein in a plane including the first direction and a second direction, the second direction being a traveling direction of the wire electrode at each of the plurality of cutting wire sections, the contact surface of the dummy workpiece is disposed in such a way as to be capable of coming into contact with the curved surface of the workpiece at an angle with respect to a straight line through the end point of the workpiece, the angle being within a range of 45 degrees in either direction, and the straight line extending in the first direction.

6. The multiwire electric discharge machine according to claim 1,
  wherein in a cutting plane of the workpiece, the cutting plane including the first direction and a second direction, the second direction being a direction in which each of the plurality of cutting wire sections travels, the pressing portion is disposed in such a way as to be capable of coming into contact with the curved surface of the workpiece at an angle with respect to a straight line through a start point at which machining of the workpiece is started by the cutting wire sections, the angle being within a range of 75 degrees in either direction, and the straight line extending in the first direction.

7. The multiwire electric discharge machine according to claim 1, wherein the pressing portion can be deformed by being pressed against the workpiece.

8. A multiwire electric discharge machining method, comprising:
  performing electric discharge machining of a workpiece having a curved surface by causing a wire electrode to travel and applying a voltage between each of a plurality of cutting wire sections and the workpiece, the plurality of cutting wire sections being sections of the wire electrode traveling in parallel with each other,
  wherein the wire electrode is wound multiple times around a plurality of guide rollers,
  wherein the electric discharge machining is started in a state where the curved surface except for an end point of the workpiece is in contact with a contact surface of a dummy workpiece, the end point of the workpiece being to be reached by the plurality of cutting wire sections when machining of the workpiece is completed, the dummy workpiece supporting the workpiece from one side in a first direction, the first direction being a direction in which the plurality of cutting wire sections moves with respect to the workpiece, and
  wherein the electric discharge machining of the workpiece includes pressing the workpiece against the dummy workpiece by moving a pressing portion from a side opposite to the dummy workpiece toward the workpiece to bring the pressing portion into direct contact with the curved surface of the workpiece.

9. A semiconductor wafer manufacturing method, comprising:
- manufacturing a plurality of semiconductor wafers by cutting the plurality of semiconductor wafers from an ingot having a curved surface by electric discharge machining by causing a wire electrode to travel,
- wherein the wire electrode is wound multiple times around a plurality of guide rollers,
- wherein the wire electrode includes a plurality of wire cutting sections,
- wherein during the electric discharge machining, a voltage is applied between each of the plurality of cutting wire sections and the ingot, the plurality of cutting wire sections being sections of the wire electrode traveling in parallel with each other,
- wherein the electric discharge machining is started in a state where the curved surface of the workpiece except for an end point of the workpiece is in contact with a contact surface of a dummy workpiece, the end point of the workpiece being to be reached by the plurality of cutting wire sections when machining of the ingot is completed,
- wherein the dummy workpiece supports the ingot from one side in a first direction, the first direction being a direction in which the plurality of cutting wire sections moves with respect to the ingot, and
- wherein the electric discharge machining of the workpiece includes pressing the ingot against the dummy workpiece by moving a pressing portion from a side opposite to the dummy workpiece in the first direction toward the ingot to bring the pressing portion into direct contact with the curved surface of the ingot while the electric discharge machining is continuing.

10. The multiwire electric discharge machining method according to claim 8, wherein
- the dummy workpiece has a recess formed at a position facing a part of the curved surface of the workpiece, the part of the curved surface including the end point of the workpiece, and
- the contact surface is provided adjacent to the recess.

11. The multiwire electric discharge machining method according to claim 8, wherein
- the dummy workpiece includes two or more parts capable of coming into contact with the curved surface of the workpiece except for the end point of the workpiece, and
- each of the parts of the dummy workpiece includes the contact surface.

12. The semiconductor wafer manufacturing method according to claim 9, wherein
- the dummy workpiece has a recess formed at a position facing a part of the curved surface of the workpiece, the part of the curved surface including the end point of the workpiece, and
- the contact surface is provided adjacent to the recess.

13. The semiconductor wafer manufacturing method according to claim 9, wherein
- the dummy workpiece includes two or more parts capable of coming into contact with the curved surface of the workpiece except for the end point of the workpiece, and
- each of the parts of the dummy workpiece includes the contact surface.

* * * * *